United States Patent [19]

Damen et al.

[11] Patent Number: 5,689,361

[45] Date of Patent: Nov. 18, 1997

[54] APPARATUS AND METHOD FOR FEMTOSECOND PULSE COMPRESSION BASED ON SELECTIVE ATTENUATION OF A PORTION OF AN INPUT POWER SPECTRUM

[75] Inventors: Theodoor Charlouis Damen, Colts Neck; Martin C. Nuss, Fair Haven, both of N.J.

[73] Assignee: Lucent Technologies Inc., Murray Hill, N.J.

[21] Appl. No.: 589,224

[22] Filed: Jan. 22, 1996

[51] Int. Cl.⁶ ..................................... G02F 1/09
[52] U.S. Cl. ................ 359/284; 359/285; 359/305; 359/308; 359/563; 385/37; 385/28
[58] Field of Search ..................... 359/284, 285, 359/305, 306, 308, 310, 563, 566, 559; 385/37, 28, 123

[56] References Cited

U.S. PATENT DOCUMENTS

| | | | |
|---|---|---|---|
| 4,655,547 | 4/1987 | Heritage et al. | 359/563 |
| 4,786,124 | 11/1988 | Stone et al. | 359/285 |
| 5,430,817 | 7/1995 | Vengsarkar | 385/37 |
| 5,526,171 | 6/1996 | Warren | 359/285 |

OTHER PUBLICATIONS

Andrew M. Weiner et al., "Programmable Shaping of Femtosecond Optical Pulses by Use of 128–Element Liquid Crystal Phase Modulator," *IEEE Journal of Quantum Electronics*, vol. 28, No. 4, Apr. 1992, pp. 908–920.

A.M. Weiner et al., "High–resolution femtosecond pulse shaping," *J. Opt. Soc. Am. B*, vol. 5, No. 8, Aug. 1988, pp. 1563–1572.

*Primary Examiner*—Loha Ben

[57] ABSTRACT

An apparatus for, and method of, decreasing a temporal duration of an optical input pulse having an input power spectrum associated therewith, the apparatus and method operative on at least unchirped optical input pulses. The apparatus comprises: (1) a zero-dispersion pulse shaper for receiving the optical input pulse and spectrally spreading the input pulse to produce a spectrally-spread pulse and (2) a modulator array interposed within the zero-dispersion pulse shaper for receiving the spectrally-spread pulse and selectively attenuating a portion of the power spectrum of the spectrally-spread pulse by a predetermined amount to produce a selectively-attenuated spectrally-spread pulse, the zero-dispersion pulse shaper focusing and recombining the selectively-attenuated spectrally-spread pulse to produce an output pulse having a broader power spectrum than the input pulse, the output pulse further having a temporal duration less than the input pulse, regardless of whether the input pulse is chirped.

21 Claims, 5 Drawing Sheets

SETUP OF THE LINEAR PULSE COMPRESSOR

POWER SPECTRUM OF 100 fs PULSE (SOLID), AS WELL AS SPECTRA AFTER SELECTIVE ATTENUATION OF CENTRAL PORTION OF THE SPECTRUM (DASHED AND DOTTED CURVES)

ORIGINAL 100 fs PULSE (SOLID) AND COMPRESSED PULSES CALCULATED BY FOURIER-TRANSFORMATION OF THE MANIPULATED POWER SPECTRA (DASHED AND DOTTED) IN FIG. 3

APPARATUS AND METHOD FOR FEMTOSECOND PULSE COMPRESSION BASED ON SELECTIVE ATTENUATION OF A PORTION OF AN INPUT POWER SPECTRUM

TECHNICAL FIELD OF THE INVENTION

The present invention is directed, in general, to optical pulse compression and, more specifically, to an apparatus and method for decreasing the temporal duration of an optical pulse by attenuating a central portion of the input power spectrum.

BACKGROUND OF THE INVENTION

Conventionally, those of ordinary skill in the art have believed that optical pulse compression is only possible by employing nonlinear techniques, such as self-phase-modulation in optical fibers or by active phase modulation by means of electro-optic modulators. As those of ordinary skill in the art are aware, this is because the time-bandwidth product, given by $\Delta v \cdot t_p$, is constant for a given pulse shape. For instance, for a Gaussian-shaped optical pulse of duration $t_p$, the minimum possible spectral bandwidth $\Delta v$ is always related to the pulse duration by $\Delta v \cdot t_p = 0.44$. Such an optical pulse is known as a "transform-limited," or "un-chirped," pulse. If the time-bandwidth product of an optical pulse is larger than this minimum value, then the pulse is said to have excess spectral bandwidth; i.e. a "chirped" pulse. An optical pulse having "excess" bandwidth (i.e. a "chirped" pulse) can be compressed into a shorter, transform-limited pulse by chirp compensation techniques. Hence, to generate a compressed pulse, additional spectral bandwidth $\Delta v$ must be generated, which, according to the conventional beliefs of those skilled in the art, has required non-linear techniques, such as chirping the pulse by means of self-phase modulation.

Prior art techniques for linear manipulation of the power spectrum of an optical pulse (commonly employed in femtosecond pulse shaping for chirp purposes other than pulse compression) have proven completely unsuitable for pulse compression. Because no additional spectrum is added to the input pulse, such prior linear techniques have generated output pulses that can only be as short as the corresponding input pulses. For example, U.S. Pat. No. 4,655,547 to Heritage, et al. discloses various apparatuses for controlling, manipulating, and tailoring the shape of input optical pulses to produce output pulses which can be shorter than the input pulses. However, in order to produce an output pulse having a decreased temporal duration with respect to the input pulse, the operation of the apparatuses as therein disclosed requires that additional spectral bandwidth be added to the input pulses. The additional spectral bandwidth is achieved through chirping of the optical input pulse by a non-linear interaction, e.g. self-phase modulation between an optical fiber and the optical input pulse.

Additionally, spectral shaping devices in the prior art have not provided dynamic control of the transmission function necessary to accommodate variations in the power spectrum of optical pulses. Dynamic control of the transmission function of a spectral shaping device, by means of feedback or feed-forward techniques, could, for example, adaptively correct for an anomalous or time-varying power spectrum associated with a stream of optical input pulses.

Accordingly, what is needed in the art is an apparatus and method, operative on at least non-chirped optical input pulses, for decreasing a temporal duration of an optical input pulse having an input power spectrum associated therewith. There exists a further need in the art to control adaptively the transmission function of an optical pulse shaper in response to variations in the power spectrum of the optical pulse, thereby realizing an optical pulse having a desired pulse duration and shape.

SUMMARY OF THE INVENTION

To address the above-discussed deficiencies of the prior art, the present invention provides an apparatus and method, operative on at least unchirped optical input pulses, for decreasing a temporal duration of an optical input pulse having an input power spectrum associated therewith. The apparatus comprises: (1) a zero-dispersion pulse shaper for receiving the input pulse and spectrally spreading the input pulse to produce a spectrally-spread pulse and (2) a modulator array interposed within the zero-dispersion pulse shaper for receiving the spectrally-spread pulse and selectively attenuating a portion of the power spectrum of the spectrally-spread pulse to produce a selectively-attenuated pulse, the zero-dispersion pulse shaper reconcentrating and recombining the selectively-attenuated pulse to produce an output pulse having a broader spectral bandwidth $\Delta v$, the output pulse thereby having a decreased temporal duration $t_p$.

The present invention therefore recognizes that additional spectral bandwidth $\Delta v$, and hence shorter pulses, can be generated simply by proper modulation of the power spectrum of an optical pulse, thereby avoiding non-linear techniques, such as chirping of the optical input pulse by means of self-phase modulation or active phase modulation. The present invention employs the modulator array to attenuate one or more selected portions of the power spectrum of the spectrally-spread pulse. When subsequently recombined, the pulse is of shorter duration.

In a preferred embodiment of the present invention, the apparatus further comprises: (1) spectrum-measuring circuitry adapted to measure the power spectrum of the output pulse and (2) circuitry for adaptively controlling the spectrally-selective attenuation of the modulator array as a function of the power spectrum of the output pulse, to thereby realize additional spectral bandwidth $\Delta v$, the output pulse thereby having a decreased temporal duration $t_p$.

In some applications, the power spectrum of the input pulse may change from pulse to pulse or drift over a period of time. In such applications, an immutable transmission function for the modulator array is not appropriate. Thus, the present invention may provide an active control loop that may further be a feedback loop. According to a preferred embodiment, the output power spectrum is measured and employed, in a manner to be described more fully, to control the modulator array. Of course, a feed-forward or open loop control may be appropriate in other applications. All methods of control are within the scope of the present invention.

In a more preferred embodiment, the spectrum-measuring circuitry comprises a spectrometer. As those of ordinary skill in the pertinent art are aware, spectrometers are conventionally employed to measure spectra. However, other spectrum-measuring circuitry or instruments are within the scope of the present invention.

In a preferred embodiment of the present invention, the control circuitry comprises a general purpose computer under direction of a computer program to control the modulator array. In a manner to be described, a computer may be programmed to receive signals from the spectrum-measuring circuitry, calculate a transmission function from the signals and control the modulator array in response to the calculated transmission function.

In a preferred embodiment of the present invention, the modulator array selectively attenuates a central portion of the input power spectrum. By attenuating the central portion of the input power spectrum, the spectral bandwidth is increased and, consequently, the optical pulse is temporally narrowed. Portions of the input power spectrum other than the central portion may be attenuated to shape the output pulse in other ways.

In a preferred embodiment of the present invention, the modulator array comprises a liquid crystal ("LC") linear modular array. By selective application of drive current to the LC linear modular array, each pixel comprising the array assumes a select finite gray-level, whereby select portions of the input-pulse power spectrum may be selectively attenuated. Other devices suitable for attenuation of selected portions of the spectrum of an optical pulse, such as a multi-quantum-well (MQW) modulator array or a micromechanical modulator array, are also within the scope of the present invention.

In a preferred embodiment of the present invention, diffraction gratings within the zero-dispersion pulse shaper spectrally spread the input pulse and recombine the focused selectively-attenuated spectrally-spread pulse. In a related preferred embodiment of the present invention, refractive lenses within the zero-dispersion pulse shaper collimate the spectrally-spread pulse and focus the collimated selectively-attenuated spectrally-spread pulse.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
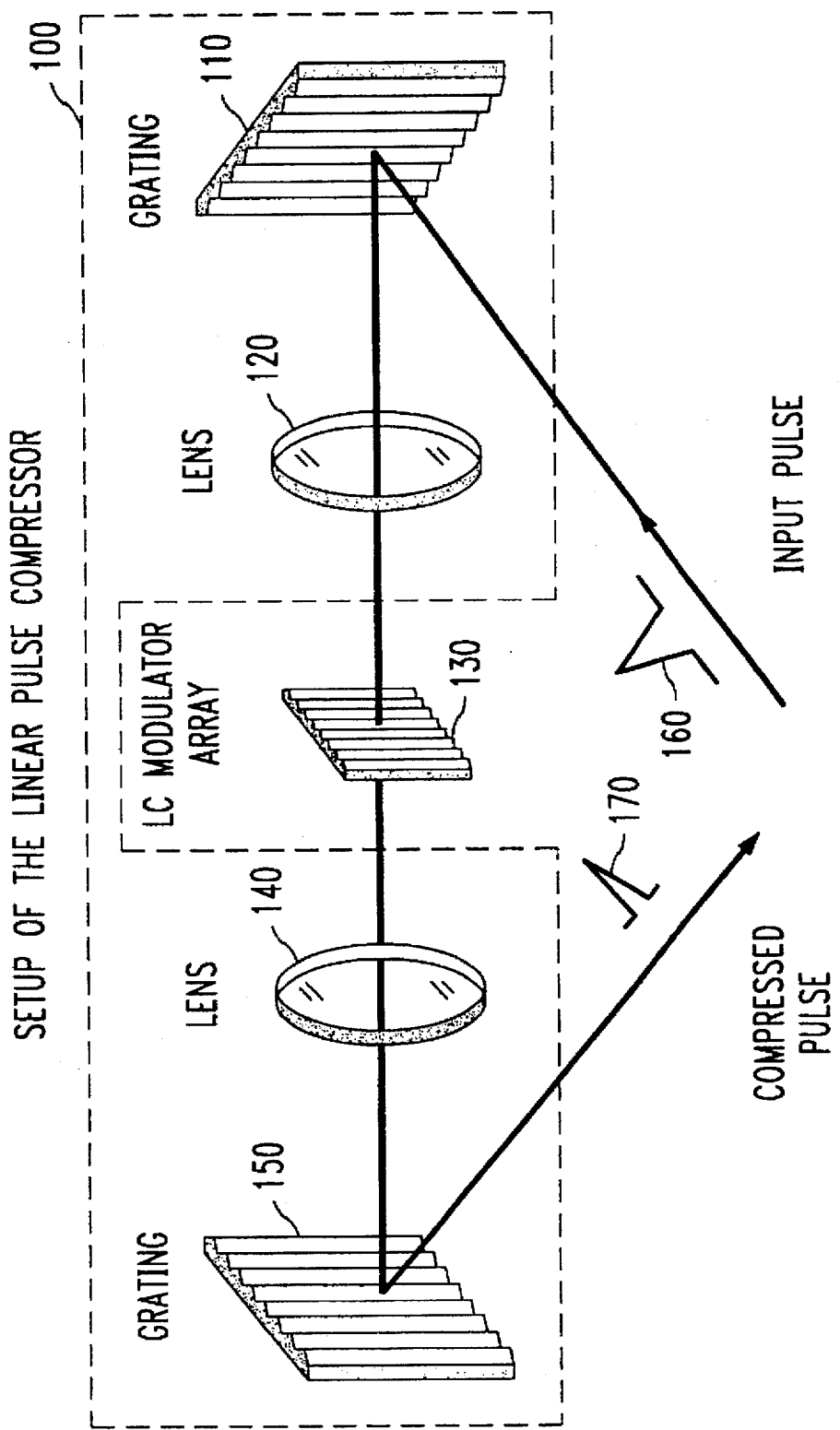
FIG. 1 illustrates a diagram of a zero-dispersion pulse shaper having a modulator array interposed therein according to one aspect of the present invention.

Referring initially to FIG. 1, illustrated is a diagram of a zero-dispersion pulse shaper having a modulator array interposed therein according to one aspect of the present invention. The zero-dispersion pulse shaper 100 comprises a first diffraction grating 110, a first lens 120, a second lens 140 and a diffraction grating 150. The first diffraction grating 110 consists of an assembly of narrow slits or grooves, that, when illuminated by an optical input pulse 160, produces a large number of beams that interfere to produce spectra.

The first diffraction grating 110 works in concert with the first lens 120 to disperse the optical input pulse 160 spectrally. The spectral dispersion of the combination of the first diffraction grating 110 and first lens 120 must be large enough so that the pulse spectrum is sufficiently spread out over many pixels of the modulator array 130.

Interposed within the zero-dispersion pulse shaper 100 is an amplitude modulator array 130 inserted in the spectrum plane of the instrument. Those skilled in the art will recognize that an LC linear modular array can properly function as an optical amplitude modulator. The modulator array 130 is driven such that pixels receiving the middle of the spectrally-dispersed optical input pulse 160 power spectrum are controlled to assume a finite gray-level, while the pixels receiving the wings of the power spectrum remain fully transparent, thereby selectively attenuating a central portion of the power spectrum of the spectrally-dispersed optical input pulse 160. The zero-dispersion pulse shaper 100 then focuses and recombines the selectively-attenuated spectrally-dispersed optical input pulse 160 by means of the second lens 140 and the second diffraction grating 150, to produce an optical output pulse 170 having a decreased temporal duration with respect to the optical input pulse 160. In contrast, the output optical pulse of an apparatus comprised solely of a zero-dispersion pulse shaper, without a modulator array interposed therein and operated as herein described, will have the same duration as the input optical pulse.

Figure 2:
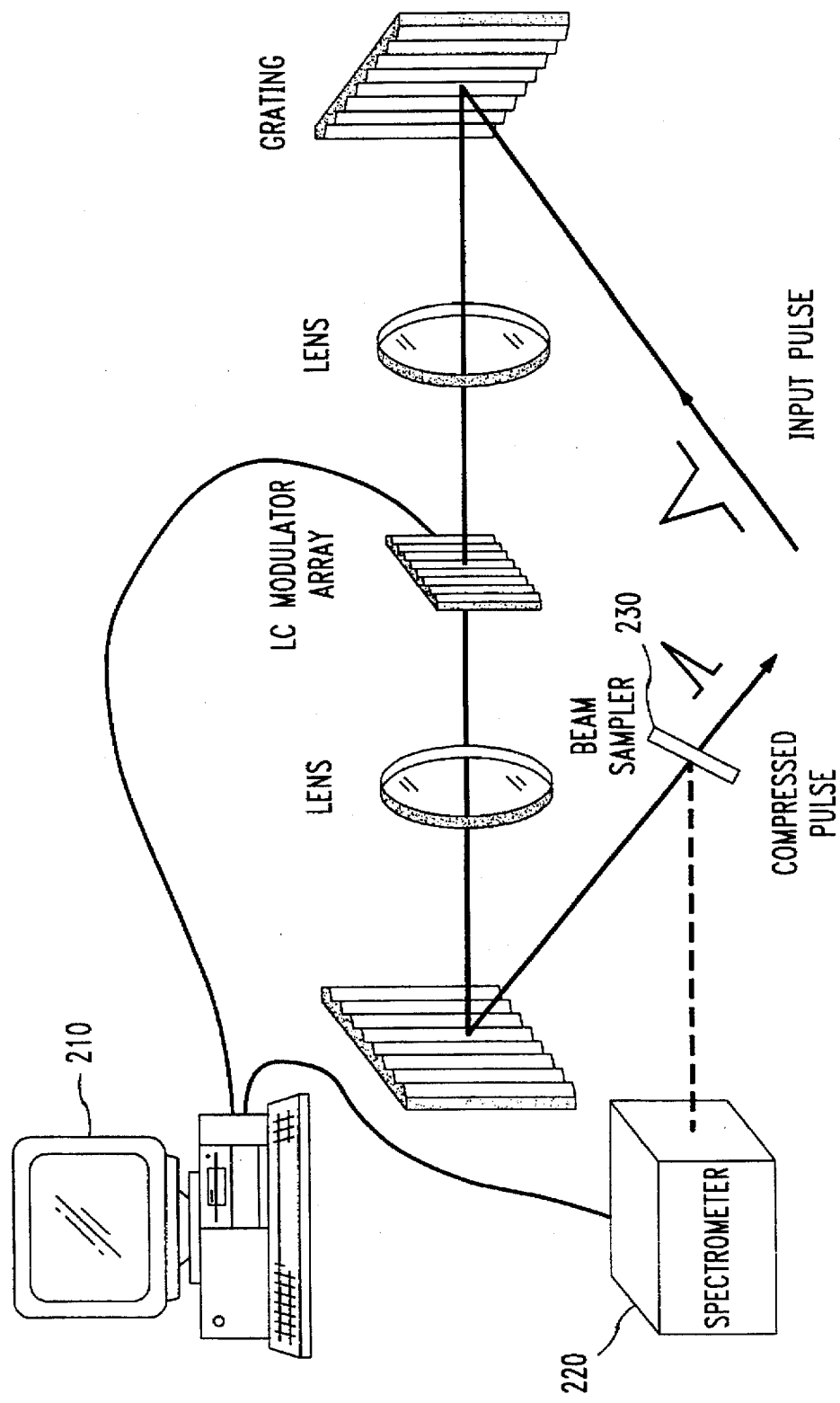
FIG. 2 illustrates a diagram of the zero-dispersion pulse shaper of FIG. 1 having an adaptively-controlled modulator array interposed therein according to another aspect of the present invention.

Turning now to FIG. 2, illustrated is a diagram of the zero-dispersion pulse shaper of FIG. 1 having an adaptively-controlled modulator array 130 interposed therein, according to another aspect of the present invention. The spectral transmission function required to generate a desired output pulse shape depends on the shape or spectrum of the input pulse. Therefore, to accommodate variations in the power spectrum of the input pulse, the transmission function of the modulator array may be adaptively controlled by a general purpose computer 210 in response to variations in the output pulse 170 or, in an alternative embodiment, the input pulse 160 power spectrum. A beam sampler 230 samples the power spectrum of the output pulse 170 and directs a portion of the output pulse 170 to a spectrometer 220. The spectrometer 220 analyzes the power spectrum of the output pulse and transmits appropriate data to the general purpose computer 210. In response to this data, the computer 210 calculates an appropriate transmission function for the modulator array 130, employing the method illustrated in the flow diagram of FIG. 5, discussed hereinafter.

Figure 3:
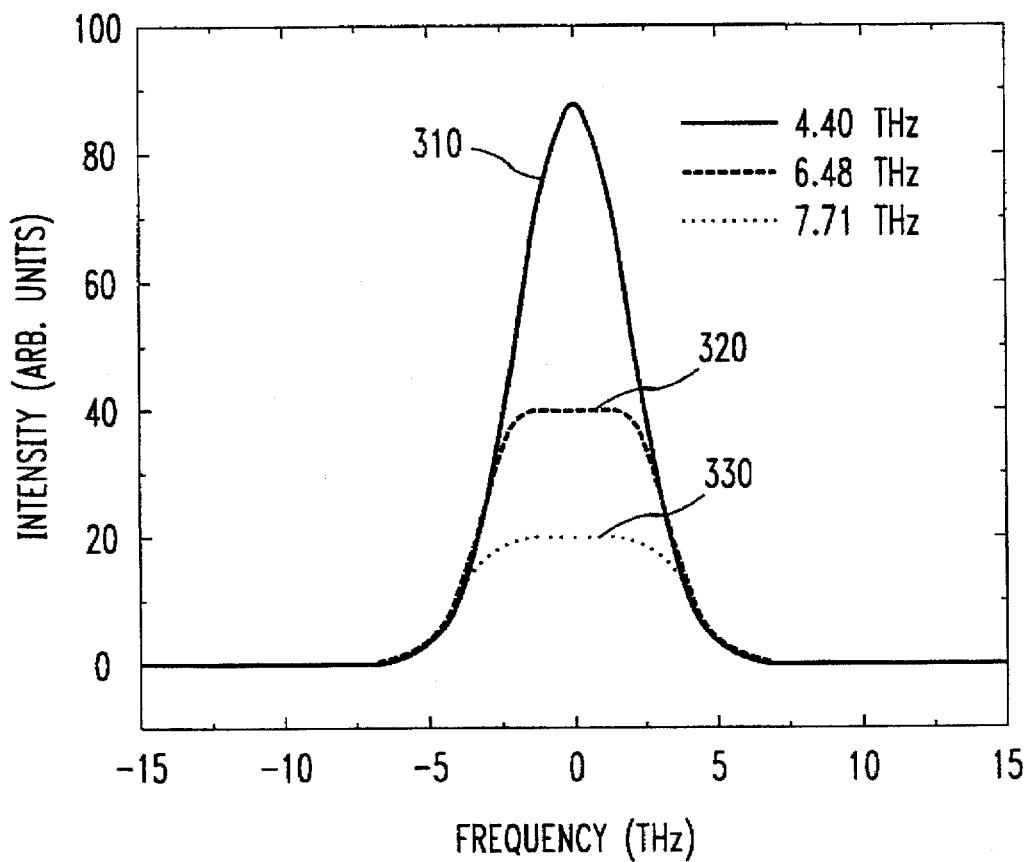
FIG. 3 illustrates a graph of a power spectrum of a 100 fs unattenuated pulse as well as spectra of the pulse after selective attenuation of a central portion of the spectrum by two predetermined amounts.

Turning now to FIG. 3, illustrated is a graph of a power spectrum 310 of a 100 fs unattenuated pulse, as well as manipulated power spectra 320, 330 of the pulse after selective attenuation of a central portion of the power spectrum by two different, predetermined amounts. The full-width at half maximum ("FWHM") of the power spectrum of a Gaussian pulse of $t_p$=100 fs duration is $\Delta v$=4.4 THz, corresponding to the power spectrum 310. From FIG. 3, it can be seen that the FWHM of the power spectrum increases to 6.48 THz (the manipulated power spectrum 320) and 7.71 THz (the manipulated power spectrum 330) for the two levels of attenuation of the central portion of the power spectrum of the 100 fs pause.

Figure 4:
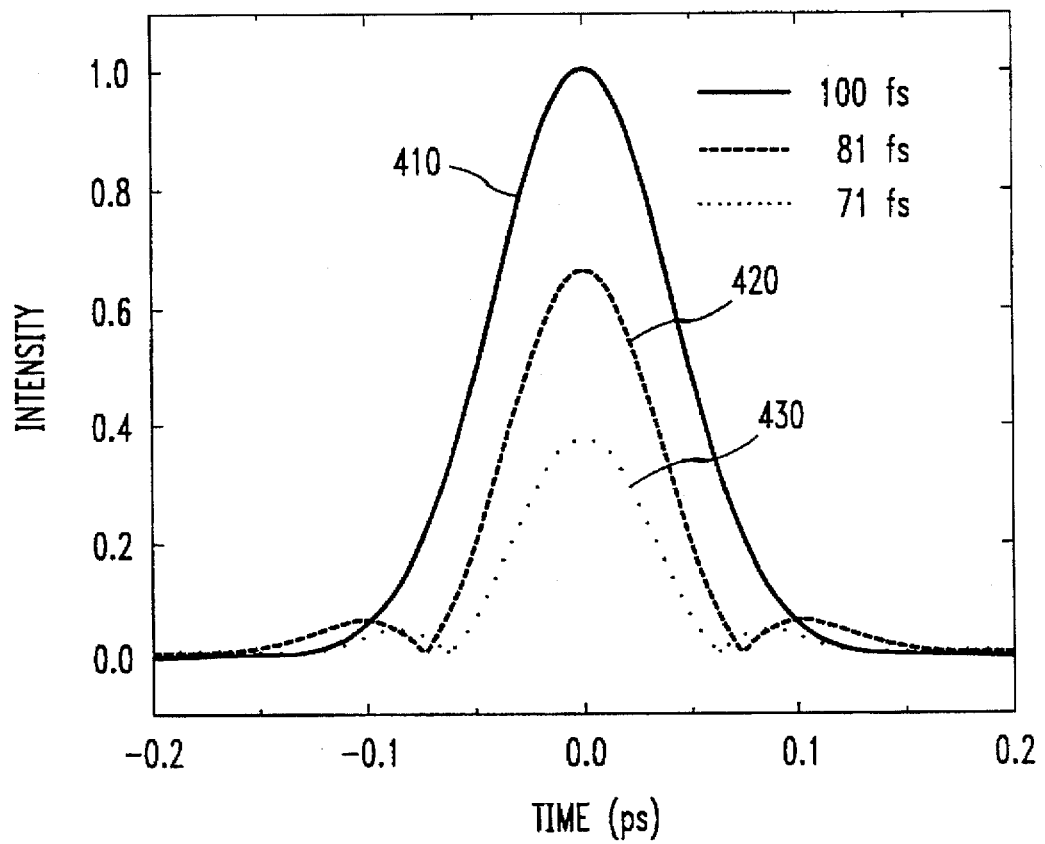
FIG. 4 illustrates a graph of pulse shapes of the original 100 fs unattenuated pulse and two selectively attenuated pulses of FIG. 3.

Turning now to FIG. 4, illustrated is a graph of the optical pulse shapes 410 of the original 100 fs unattenuated pulse and the two selectively attenuated pauses of FIG. 3 (represented by the manipulated power spectra 320, 330). The optical pulse shapes after filtering are calculated by Fourier-transformation of the spectra 310, 320, 330. Pulse compression from 100 fs to 81 fs and 71 fs is obtained for the two manipulated spectra 320 and 330 of FIG. 3, respectively. It can therefore be seen that a 30% pause compression can be obtained with only a twofold reduction in peak intensity.

Figure 5:
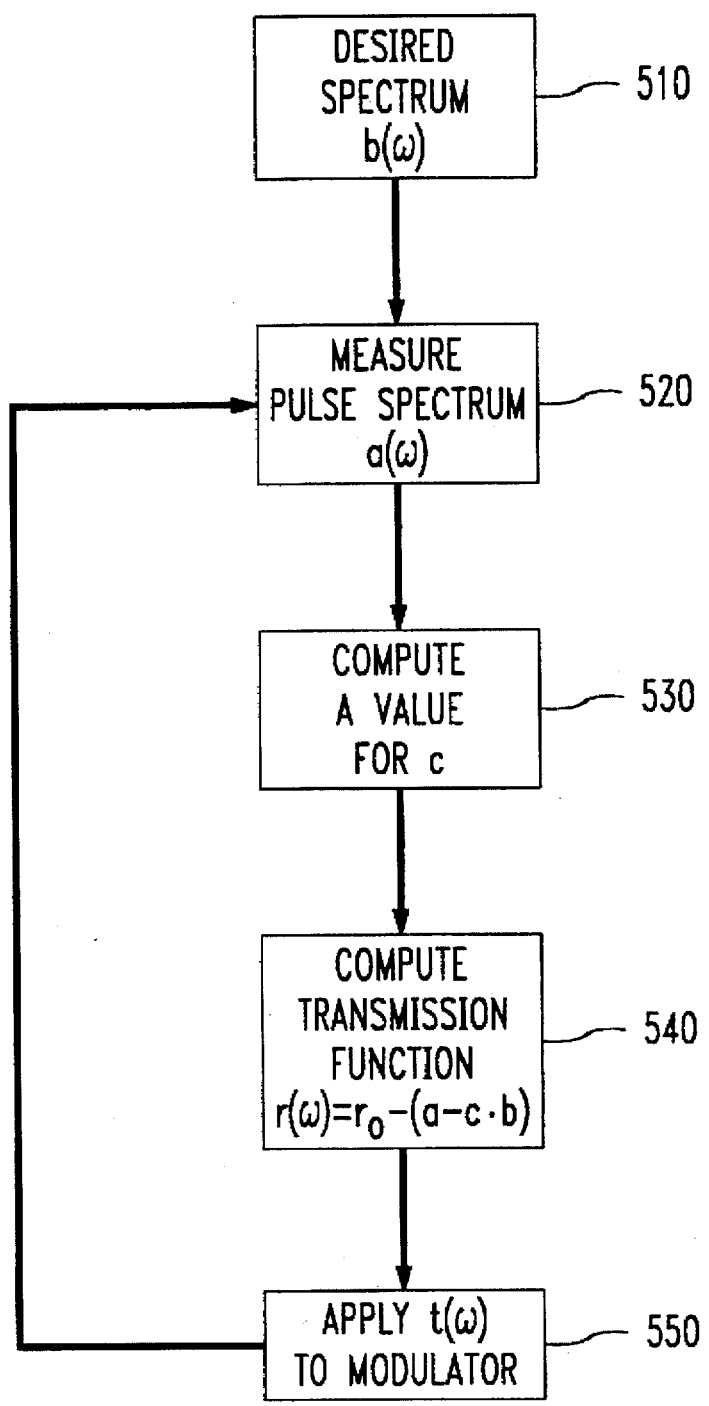
FIG. 5 illustrates a flow diagram of a computer program for the general purpose computer of FIG. 2.

Turning now to FIG. 5, illustrated is a flow diagram of a computer program for the general purpose computer of FIG. 2. The flow diagram depicts the procedure to optimize the transmission function, $t(\omega)$, of the modulator array 130 interposed in the spectrum plane of the zero-dispersion pause shaper 100 as depicted in FIG. 1, where the modulator array 130 is adaptively controlled as in FIG. 2.

The method begins in a step 510, wherein the desired power spectrum, $b(\omega)$, is received by the general purpose computer 210. Step 520 involves measuring the real-time power spectrum $a(\omega)$ of the output pulse 170 of the zero-dispersion pulse shaper 100. As previously discussed in reference to FIG. 2, the spectrometer 220 analyzes the power spectrum of the output pulse 170 and transmits appropriate data to the general purpose computer 210. This data represents the power spectrum, $a(\omega)$, of the output pulse 170.

Step 530 involves maximizing the value for c, such that the quantity $a(107)-c \cdot b(\omega)$ approaches zero for those spectral components, to, near the wings of the pause spectra, but has some finite positive value for those spectral components near the center of the pulse spectra. It is then possible, in a Step 540, to compute the appropriate transmission function $t(\omega)$ for the modulator array 130; the transmission function $t(\omega)$ being equal to $t_0-(a-cb)$.

The final step, step 550, calls for the computed transmission function, $t(\omega)$, to be applied to the modulator array 130. The procedure then returns to the step 520 where the process begins again, thereby continually adjusting the modulator array 130 until the desired power spectrum $b(\omega)$ of the desired temporally-narrowed output pulse is realized.

Those skilled in the art will note that for transform-limited input pulses, i.e. for pulses without "chirp," the output pulses 170 can be fully predicted by measuring only the power spectrum and the procedure to optimize the transmission function of the modulator array is as depicted in the flow diagram of FIG. 5. However, if an input pulse 160 is chirped, the measurement of the power spectrum alone is not sufficient to determine the output pulse 170. If the chirp is linear, the chirp can be taken out before the pulse compression by varying the distances between the first and second diffraction gratings 110, 150 and the first and second lenses 120, 140.

If the chirp is non-linear, it is necessary to determine the amplitude and phase of the pulse spectra by either a frequency-resolved optical gating ("FROG") technique or another conventional pulse characterization technique. The optimal transmission function, both amplitude and phase, can then be calculated using the procedure as described in FIG. 5. Those skilled in the art will recognize that a LC modulator array can be configured as an amplitude or phase modulator. Thus, the apparatus as shown in FIG. 2 may further include a second LC modulator array configured as a phase modulator. The optimal transmission function may be resolved into amplitude and phase components, which may separately control the amplitude and phase transmission functions of the first and second LC modulator arrays, thereby realizing the desired power spectrum $b(\omega)$ of the desired temporally-narrowed output pulse.

Although the present invention has been described in detail, those skilled in the art should understand that they can make various changes, substitutions and alterations herein without departing from the spirit and scope of the invention in its broadest form.

What is claimed is:

1. An apparatus for decreasing a temporal duration of an optical input pulse having an input power spectrum associated therewith, said apparatus operative on at least unchirped optical input pulses, said apparatus comprising:

a zero-dispersion pulse shaper for receiving said optical input pulse and spectrally spreading said optical input pulse to produce a spectrally-spread pulse;

a modulator array interposed within said zero-dispersion pulse shaper for receiving said spectrally-spread pulse; and control circuitry, coupled to said modulator array, that selectively drives individual pixels of said modulator array to a finite gray-level, whereby said modulator array selectively attenuates a portion of said power spectrum of said spectrally-spread pulse by a predetermined amount to produce a selectively-attenuated spectrally-spread pulse, said zero-dispersion pulse shaper focusing and recombining said selectively-attenuated spectrally-spread pulse to produce an output pulse having a broader power spectrum than said input pulse, said output pulse further having a temporal duration less than said input pulse, regardless of whether said input pulse is chirped.

2. The apparatus as recited in claim 1 further comprising spectrum-measuring circuitry adapted to measure the power spectrum of said output pulse, said spectrum-measuring circuitry coupled to said control circuitry, whereby said control circuitry can alter said predetermined amount as a function of said power spectrum of said output pulse.

3. The apparatus as recited in claim 2 wherein said spectrum-measuring circuitry comprises a spectrometer.

4. The apparatus as recited in claim 2 wherein said control circuitry comprises a general purpose computer under direction of a computer program to control said modulator array.

5. The apparatus as recited in claim 1 wherein said modulator array selectively attenuates a central portion of said input power spectrum.

6. The apparatus as recited in claim 1 wherein said modulator array comprises a liquid crystal (LC) linear array.

7. The apparatus as recited in claim 1 wherein diffraction gratings within said zero-dispersion pulse shaper spectrally spread said input pulse and recombine said selectively-attenuated spectrally-spread pulse.

8. The apparatus as recited in claim 1 wherein refractive lenses within said zero-dispersion pulse shaper collimate said spectrally-spread pulse and focus said selectively-attenuated spectrally-spread pulse.

9. A method of decreasing a temporal duration of an optical input pulse having an input power spectrum associated therewith, said method operative on at least unchirped optical input pulses, said method comprising the steps of:

initially receiving said optical input pulse into a zero-dispersion pulse shaper, said zero-dispersion pulse shaper spectrally spreading said optical input pulse to produce a spectrally-spread pulse; and subsequently receiving said spectrally-spread pulse into a modulator array interposed within said zero-dispersion pulse shaper, control circuitry, coupled to said modulator array, selectively driving individual pixels of said modulator array to a finite gray-level, whereby said modulator array selectively attenuates a portion of said power spectrum of said spectrally-spread pulse by a predetermined amount to produce a selectively-attenuated spectrally-spread pulse, said zero-dispersion pulse shaper focusing and recombining said selectively-attenuated spectrally-spread pulse to produce an output pulse having a broader power spectrum than said input pulse, said output pulse further having a temporal duration less than said input pulse, regardless of whether said input pulse is chirped.

10. The method as recited in claim 9 further comprising the steps of:

measuring the power spectrum of said output pulse; and controlling said modulator array, with said control circuitry, to alter said predetermined amount as a function of said power spectrum of said output pulse.

11. The apparatus as recited in claim 10 wherein said step of measuring comprises the step of gauging said power spectrum of said output pulse with a spectrometer.

12. The apparatus as recited in claim 10 wherein said step of controlling comprises the step of directing a general purpose computer with a computer program.

13. The method as recited in claim 9 further comprising the step of selectively attenuating a central portion of said input power spectrum.

14. The method as recited in claim 9 wherein said modulator array comprises a liquid crystal (LC) linear array.

15. The method as recited in claim 9 further comprising the step of spectrally spreading said input pulse and recombining said spectrally-spread pulse with diffraction gratings within said zero-dispersion pulse shaper.

16. The method as recited in claim 9 further comprising the step of collimating said spectrally-spread pulse and focusing said selectively-attenuated spectrally-spread pulse with refractive lenses within said zero-dispersion pulse shaper.

17. An apparatus for decreasing a temporal duration of an optical input pulse having an input power spectrum associated therewith, said apparatus operative on at least unchirped optical input pulses, said apparatus comprising:

a zero-dispersion pulse shaper for receiving said optical input pulse and spectrally spreading said optical input pulse to produce a spectrally-spread pulse;

a liquid crystal (LC) modulator array interposed within said zero-dispersion pulse shaper for receiving said spectrally-spread pulse;

control circuitry, coupled to said LC modulator array, that selectively drives individual pixels of said modulator array to a finite gray-level, whereby said modulator array selectively attenuates a central portion of said power spectrum of said spectrally-spread pulse by a predetermined amount to produce a selectively-attenuated spectrally-spread pulse, said zero-dispersion pulse shaper focusing and recombining said selectively-attenuated spectrally-spread pulse to produce an output pulse having an output power spectrum;

spectrum-measuring circuitry adapted to measure said output power spectrum, said control circuitry controlling said LC modulator array to alter said predetermined amount as a function of said output power spectrum, said output pulse further having a controllably decreased temporal duration, regardless of whether said input pulse is chirped.

18. The apparatus as recited in claim 17 wherein said spectrum-measuring circuitry comprises a spectrometer.

19. The apparatus as recited in claim 17 wherein said control circuitry comprises a general purpose computer under direction of a computer program to control said LC modulator array.

20. The apparatus as recited in claim 17 wherein diffraction gratings within said zero-dispersion pulse shaper spectrally spread said input pulse and recombine said selectively-attenuated spectrally-spread pulse.

21. The apparatus as recited in claim 17 wherein refractive lenses within said zero-dispersion pulse shaper collimate said spectrally-spread pulse and focus said selectively-attenuated spectrally-spread pulse.

* * * * *